United States Patent
Lin et al.

(10) Patent No.: US 7,974,728 B2
(45) Date of Patent: Jul. 5, 2011

(54) SYSTEM FOR EXTRACTION OF KEY PROCESS PARAMETERS FROM FAULT DETECTION CLASSIFICATION TO ENABLE WAFER PREDICTION

(75) Inventors: Chun-Hsien Lin, Hsinchu (TW); Francis Ko, Taichung (TW); Kewei Zuo, Taipei County (TW); Henry Lo, Hsinchu (TW); Jean Wang, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 163 days.

(21) Appl. No.: 12/026,361

(22) Filed: Feb. 5, 2008

(65) Prior Publication Data

US 2008/0275585 A1    Nov. 6, 2008

Related U.S. Application Data (60) Provisional application No. 60/916,194, filed on May 4, 2007.

(51) Int. Cl.
| | |
|---|---|
| *G06F 19/00* | (2006.01) |
| *G06F 15/18* | (2006.01) |
| *G06F 17/18* | (2006.01) |
| *G05B 13/02* | (2006.01) |

(52) U.S. Cl. ............ 700/121; 700/51; 700/108; 706/13; 702/179

(58) Field of Classification Search .......... 700/108–111, 700/32, 709, 51, 15, 49, 83, 95, 121, 174, 700/175, 177; 702/179–185; 706/13
See application file for complete search history.

(56) References Cited

U.S. PATENT DOCUMENTS

| | | | |
|---|---|---|---|
| 5,048,800 A | 9/1991 | Miyazaki et al. | |
| 5,440,478 A * | 8/1995 | Fisher et al. .................. | 700/109 |
| 5,847,965 A | 12/1998 | Cheng | |
| 5,963,881 A * | 10/1999 | Kahn et al. ...................... | 702/35 |
| 6,028,991 A | 2/2000 | Akashi | |
| 6,045,619 A | 4/2000 | Tai et al. | |
| 6,077,310 A | 6/2000 | Yamamoto et al. | |
| 6,289,257 B1 * | 9/2001 | Sekine .......................... | 700/121 |
| 6,408,219 B2 | 6/2002 | Lamey, Jr. et al. | |
| 6,410,351 B1 | 6/2002 | Bode et al. | |
| 6,549,864 B1 * | 4/2003 | Potyrailo ........................ | 702/81 |
| 6,560,503 B1 | 5/2003 | Toprac et al. | |
| 6,810,296 B2 | 10/2004 | Bode et al. | |
| 6,917,849 B1 | 7/2005 | Pasadyn et al. | |
| 6,968,253 B2 * | 11/2005 | Mack et al. ................... | 700/121 |
| 6,980,873 B2 * | 12/2005 | Shen .............................. | 700/108 |

(Continued)

OTHER PUBLICATIONS

Yue, H. H.; Qin, S. J.; Markle, R. J.; Nauert, C.; Gatto, M., Fault detection of plasma etchers using optical emission spectra, Aug. 2000, Semiconductor manufacturing, IEEE Transactions on, vol. 13, Issue 3, Aug. 2000, p. 374-385.

(Continued)

*Primary Examiner* — Sean P Shechtman
(74) *Attorney, Agent, or Firm* — Haynes and Boone, LLP (57) ABSTRACT

A system, method, and computer readable medium for extracting a key process parameter correlative to a selected device parameter are provided. In an embodiment, the key process parameter is determined using a gene map analysis. The gene map analysis includes grouping highly correlative process parameter and determining the correlation of a group to the selected device parameter. In an embodiment, the groups having greatest correlation to the selected device parameter are displayed in a correlation matrix and/or a gene map.

14 Claims, 6 Drawing Sheets

U.S. PATENT DOCUMENTS

| | | | |
|---|---|---|---|
| 7,144,297 | B2 | 12/2006 | Lin et al. |
| 7,212,878 | B2 | 5/2007 | Funk et al |
| 7,263,463 | B2 * | 8/2007 | Yamazaki ............... 702/182 |
| 7,360,191 | B2 | 4/2008 | Chang et al. |
| 7,363,207 | B2 | 4/2008 | Kamon |
| 7,694,244 | B2 | 4/2010 | Chan et al. |
| 2003/0020928 | A1 | 1/2003 | Ritzdorf et al. |
| 2004/0029299 | A1 * | 2/2004 | Pasadyn et al. ............ 438/5 |
| 2004/0040001 | A1 | 2/2004 | Miller et al. |
| 2004/0093107 | A1 | 5/2004 | Good et al. |
| 2004/0181299 | A1 | 9/2004 | Yamazaki et al. |
| 2004/0185583 | A1 | 9/2004 | Tomoyasu et al. |
| 2005/0007577 | A1 * | 1/2005 | Engelhard et al. ......... 356/124 |
| 2005/0008227 | A1 | 1/2005 | Duan et al. |
| 2005/0021272 | A1 | 1/2005 | Jenkins et al. |
| 2005/0044514 | A1 | 2/2005 | Wu et al. |
| 2005/0120328 | A1 * | 6/2005 | Seltmann et al. ............ 716/21 |
| 2005/0132306 | A1 | 6/2005 | Smith et al. |
| 2005/0188338 | A1 | 8/2005 | Kroyan et al. |
| 2005/0209820 | A1 * | 9/2005 | Inoue et al. ............ 702/183 |
| 2005/0288812 | A1 | 12/2005 | Cheng et al. |
| 2006/0026539 | A1 | 2/2006 | Tetelbaum et al. |
| 2006/0048010 | A1 | 3/2006 | Tai et al. |
| 2006/0111804 | A1 | 5/2006 | Lin |
| 2006/0123380 | A1 | 6/2006 | Ikeuchi |
| 2006/0190876 | A1 | 8/2006 | Yamada |
| 2006/0282189 | A1 * | 12/2006 | Akisawa et al. ............ 700/110 |
| 2007/0055892 | A1 | 3/2007 | Pikus |
| 2007/0101305 | A1 | 5/2007 | Smith et al. |
| 2007/0201442 | A1 | 8/2007 | Hekmatpour et al. |
| 2007/0234246 | A1 | 10/2007 | Sinha et al. |
| 2007/0265725 | A1 | 11/2007 | Liu et al. |
| 2007/0266356 | A1 | 11/2007 | Chang et al. |
| 2007/0266362 | A1 | 11/2007 | Lai et al. |
| 2007/0277134 | A1 | 11/2007 | Zhang et al. |
| 2007/0288219 | A1 | 12/2007 | Zafar et al. |
| 2009/0070725 | A1 | 3/2009 | Yamada |
| 2009/0199151 | A1 | 8/2009 | Benerjee et al. |

OTHER PUBLICATIONS

Yi-Ting Huang; Fan-Tien Cheng; Yeh-Tung Chen; Importance of Data Quality in Virtual Metrology, IEEE industrial Electronics, IECON 2006-32nd Annual conference on Nov. 6-10, 2006, p. 3727-3732.

Yaw-Jen Chang; Yuan Kang; Chih-Liang Hsu; Chi-Tim Chang; Tat Yan Chan; Virtual Metrology Technique for Semiconductor manufacturing, Neural Networks, 2006. IJCNN '06. International Joint Conference on Jul. 16-21, 2006, p. 5289-5293.

Tung-Ho Lin; Ming-Hsiung Hung; Rung-Chuan Lin; Fan-Tien Cheng; A virtual metrology scheme for predicting CVD thickness in semiconductor manufacturing, Robotics and Automation, 2006. ICRA 2006. Proceedings 2006 IEEE International Conference on May 15-19, 2006, p. 1054-1059.

Tian, Yuxin, et al., "Impact of Photolithography and Mask Variability on Interconnect Parasitics," 10 pages.

Zhou, Ying, et al., "A New Methodology for Interconnect Parasitics Extraction Considering Photo-Lithography effects," 6 pages.

U.S. Appl. No. 12/025,933, filed Feb. 5, 2008 by Francis Ko, Chih-Wei Lai, Kewei Zuo, Henry Lo, Jean Wang, Ping-hsu Chen, Chun-Hsien Lin, and Chen-Hua yu for "Novel Methodology to Realize Automatic Virtual metrology," 23 pages.

Cheng, Y.C., et al., "Patterning Effect and Correlated Electrical Model of Post-OPC MOSFET Devices," Proceeding of SPIE vol. 6521 65210G-1 to 65210G-9, 9 pages.

Ottesen, Craig, "Front Opening Pod (FOUP) Fire Protection: A General Overview," International Sematech, Nov. 5, 1999, 10 pages.

Chen, Kuah-Chou, et al., "Integrated Circuits Industry/Front-Opening Unified Pod Auto-Loading Structure," Knowledge Bridge, No. 22, Apr. 2002, 4 pages.

Chappell, Jeff, "The Future is the FOUP—company Business and Marking," Electronic News, Jul. 17, 2000, 2 pages.

Ouyang, Charles, et al., "An Analytical Model of Multiple ILD thickness Variation induced by Interaction of Layout Pattern and CMP Process," IEEE Transactions on Semiconductor Manufacturing, Aug. 2000, 7 pages.

Raghvendra, Srinivas, et al., "DFM: Linking Design and Manufacturing," Proceedings of the 18th International conference on VLSI Design held jointly with 4th International Conference on Embedded Systems Design, VLSID, 2005, 4 pages.

Tsuijikawa, Hiroyuki, et al., "Power=Supply Noise Reduction with Design for Manufacturability," IEICE Trans Fundamentals, vol. E88-A, No. 12, Dec. 2005, 8 pages.

Earl F. Glynn; Correlation "Distances" And Hierarchical Clustering; Dec. 29, 2005; pp. 1-14; http://research.stowers-institute.org/efg/R/Visualization/cor-cluster/index.htm.

* cited by examiner

Correlation Matrix of Group A    R = 0.3456

| | 1 | 2 | 3 | 4 | 5 | 6 | 7 | 8 | 9 | 10 |
|---|---|---|---|---|---|---|---|---|---|---|
| Parameter A | 1 | 1 | 1 | 1 | 1 | 1 | 1 | 1 | 1 | 1 |
| Parameter B | 1 | 0.9 | 0.9 | 1 | 1 | 1 | 1 | 1 | 1 | 1 |
| Parameter C | 1 | 1 | 1 | 0.9 | 1 | 0.9 | 0.9 | 1 | 0.9 | 0.9 |
| Parameter D | 1 | 1 | 0.9 | 1 | 1 | 1 | 1 | 1 | 1 | 1 |
| Parameter E | 1 | 1 | 1 | 1 | 1 | 1 | 1 | 0.9 | 1 | 1 |
| Parameter F | 1 | 1 | 0.9 | 1 | 1 | 1 | 1 | 1 | 1 | 1 |
| Parameter G | 1 | 1 | 0.9 | 1 | 1 | 1 | 1 | 0.9 | 1 | 1 |
| Parameter H | 1 | 1 | 1 | 0.9 | 1 | 1 | 0.9 | 1 | 1 | 1 |
| Parameter I | 1 | 1 | 0.9 | 1 | 1 | 1 | 1 | 1 | 1 | 1 |
| Parameter J | 1 | 1 | 0.9 | 1 | 1 | 1 | 1 | 1 | 1 | 1 |

SYSTEM FOR EXTRACTION OF KEY PROCESS PARAMETERS FROM FAULT DETECTION CLASSIFICATION TO ENABLE WAFER PREDICTION

This application claims the priority under 35 U.S.C. §119 of U.S. Provisional Application Ser. No. 60/916,194 entitled "METHOD AND APPARATUS TO ENABLE ACCURATE WAFER PREDICTION," filed on May 4, 2007, the contents of which is hereby incorporated by reference.

BACKGROUND

Integrated circuits are produced by a plurality of processes in a wafer fabrication facility. These processes, and associated fabrication tools, may include thermal oxidation, diffusion, ion implantation, rapid thermal processing (RTP), chemical vapor deposition (CVD), physical vapor deposition (PVD), epitaxy formation/growth processes, etch processes, photolithography processes, and/or other fabrication processes and tools known in the art. In addition, the fabrication process includes a plurality of metrology processes that provide for monitoring and control of the integrated circuit fabrication yield, quality, and reliability.

The fabrication process generate a vast quantity of data during the production of integrated circuits. However, process and equipment engineers responsible for the integrated circuit fabrication process and equipment can only determine relationships between a parameter of the fabrication process and integrated circuit (IC) performance (e.g., such as would be measured on an IC fabricated on a semiconductor substrate or wafer) by running a variety of experiments (e.g., DOEs) or through production experiences. This accumulation of data and knowledge takes substantial resources. Furthermore, experiments may only be performed on active parameters (e.g., a gas flow rate) and not passive parameters (e.g., reflected power). Further still, it is difficult to determine the contribution of each parameter elected for an experiment (e.g., in split lot) to the IC performance.

As such, improved determination of a parameter (e.g., a process parameter) that is correlative to IC device performance is desired.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is understood that specific embodiments are provided herein as examples to teach the broader inventive concept, and one of ordinary skill in the art can easily apply the teaching of the present disclosure to other methods or apparatus. In addition, it is understood that the methods and apparatus discussed in the present disclosure include some conventional structures and/or processes. Since these structures and processes are well known in the art, they will only be discussed in a general level of detail. Some intermediate structures and/or processes may be left out of the present description, their inclusion being merely a matter of design choice. Furthermore, reference numbers are repeated throughout the drawings for sake of convenience and example, and such repetition does not indicate any required combination of features or steps throughout the drawings.

Figure 1:
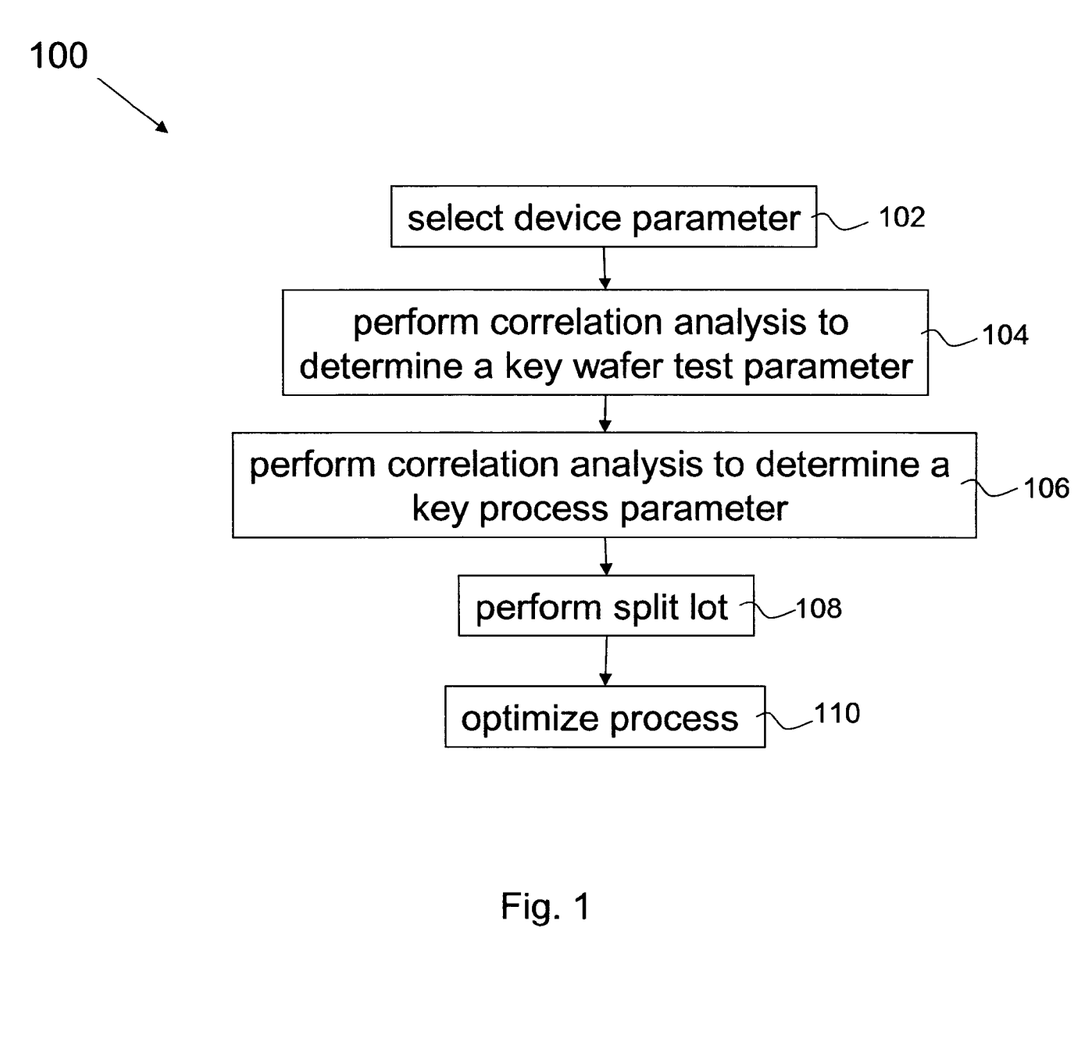
FIG. 1 is a flow chart illustrating an embodiment of a method of extracting a key process parameter.

Referring to FIG. 1, illustrated is a method 100 for extraction of a key process parameter. The method 100 begins at step 102 where a device parameter is selected. A device parameter includes a parameter, including an electrical or physical parameter, associated with an integrated circuit which may be indicative of IC device performance. In an embodiment, a value for the device parameter is determined (e.g., measured) at a wafer-level test of an IC device or portion thereof. Examples of device parameters include Iddq (change in saturation current), a leakage parameter, a speed parameter, and/or a variety of other device parameters known in the art.

The method then proceeds to step 104 where a wafer test parameter correlative to the selected device parameter is determined. In other words, a correlation analysis is performed to determine one or more wafer test parameter(s) affecting the device parameter selected above in step 102. The affect of one parameter upon another parameter may be measured by statistical tools such as an $R^2$ value (coefficient of determination). A wafer test parameter that is correlative to the device parameter may be referred to herein as a "key" wafer test parameter. In an embodiment, key wafer test parameters are those with an $R^2$ value greater than a selected value; the value selected using criteria such as, performance of the process to be analyzed, resources to be used to perform the correlation analysis, and/or other considerations known to one skilled in the art. The correlation analysis may include a gene map analysis such as described in further detail below in reference FIG. 3. In other embodiments, various statistical tools and methodologies may be used to determine one or more key WAT parameter(s). The wafer test parameter may also be known as a wafer acceptance test (WAT) parameter. A wafer test (e.g., WAT) process includes a wafer level electrical testing of an IC or a test structure formed on a semiconductor substrate (e.g., wafer). A WAT process typically includes measurement of wafer test parameters at a plurality of test sites (e.g., probe sites) on a wafer. The probe sites may be positioned in the scribe line of the wafer or interspersed among the integrated circuit devices. Wafer test parameters may include measurements of resistance, current, and/or other parameters known in the art. The values associated with the wafer test parameters are described herein as WAT data. To perform the correlation analysis, WAT from a plurality of wafers and the corresponding device performance (e.g., values for device parameters) may be gathered. In an embodiment, WAT data for over 200 wafers is gathered. In an embodiment, step 104 may be omitted.

The method 100 then proceeds to step 106 where a key process parameter is determined. The key process parameter may be correlative to the key wafer test parameter and/or the selected device parameter, described above in reference to steps 104 and 102, respectively. In other words, a correlation analysis is performed to determine a key process parameter affecting the device parameter selected above in step 102. In an embodiment, a correlation analysis is performed to extract a process parameter that is correlative to the key wafer test parameter determined in step 104.

A process parameter may include an equipment or metrology parameter associated with the fabrication process. The value of a process parameter may be determined during fabrication (e.g., in-line). The values associated with a process parameter may be referred to herein as process data. A process parameter may be an active parameter or a passive parameter. An active parameter may include any fabrication parameter that can be easily specified during the fabrication process (such as, by defining the parameter in an equipment recipe.) Examples of an active parameter include an RF power, a gas flow rate, a concentration, and a processing time. A passive parameter may include any fabrication parameter that is not determined by recipe but rather, for example, inherent in a process based upon other passive and/or active parameters, a type of equipment, a condition of equipment, a condition of a wafer being processed, and/or other possible factors. Examples of a passive parameter include reflected power, ambient conditions, contaminate levels, and temperature and/or pressure profiles inherent in a tool.

To perform the correlation analysis, process data, including data for equipment parameters and metrology parameters, and the corresponding device performance (e.g., values for device parameters) and/or WAT data are gathered. In an embodiment, process data is gathered for over 200 wafers. In an embodiment, the process data includes fault detection and classification (FDC) data. In an embodiment, time series process data associated with one or more process parameters (e.g., values associated with equipment parameters) is gathered. The time series process data may include a sequence of data gathered based upon uniform time intervals, number of wafers processed, and/or other intervals that may be determined. The time series process data may include data both prior and subsequent to a preventative maintenance procedure, an equipment repair procedure, an equipment cleaning procedure, and/or other procedures typical in a fabrication process. In an embodiment, the time series process data is gathered using a conventional GEM/SECS communication. The time series process data may be summarized using statistical analysis to provide summarized process data associated with one or more process parameters.

The method 100 then proceeds to step 108 where a split lot is performed. In an embodiment, the step 108 is omitted. The split lot may process one or more wafers using various values of a key process parameter determined in step 106. The split lot may be useful to determine an optimal value or range of values of a key parameter determined in step 106. For example, in an embodiment, one or more process conditions of a gate oxide formation chamber are determined to be a key process parameter for a selected device parameter. In the embodiment, a split lot is used to determine a specific process condition (e.g., a value, setting).

The method 100 then proceeds to step 110 where the process is optimized. The process may be optimized by adjusting a value of a key process parameter, determined in step 106, to be used in the fabrication process. The value may be determined using information gathered from the split lot performed in step 108. In an embodiment, the process is optimized by changing, for example, the interval of preventative maintenance procedures, cleaning procedures, equipment repair procedures, chamber idle time, process temperature, and/or equipment replacement intervals. By way of example, in an embodiment, specific equipment sensor variation is extracted as a key process parameter affecting the equivalent oxide thickness of a device. Further analysis may provide the process parameters (e.g., related to the sensor variation) that may be adjusted during the fabrication process in order to tighten the variation of equivalent oxide thickness of a device.

Thus, the method 100 provides a determination of a key process parameter that is correlative to a selected device parameter. The method 100 may be considered a hierarchical analysis divided into two layers (e.g., (1) a key WAT parameter extraction and (2) a key process parameter extraction). However, in other embodiments, other hierarchal analysis structures are possible.

Figure 2:
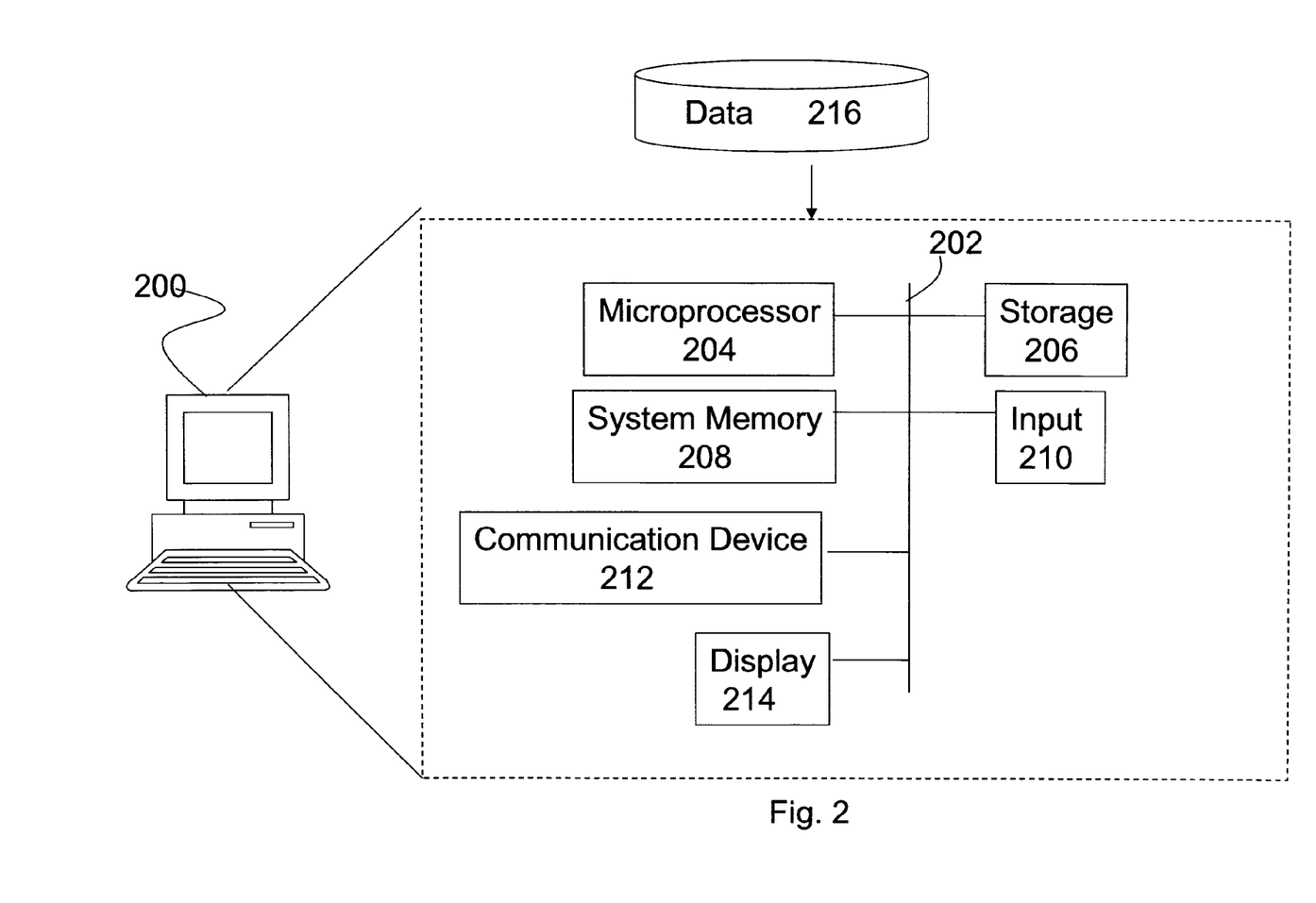
FIG. 2 is a block diagram illustrating an embodiment of a computer system.

Referring now to FIG. 2, illustrated is an embodiment of a computer system 200 for implementing embodiments of the present disclosure including the systems and methods described herein. In an embodiment, the computer system 200 includes functionality providing for the extraction of a key process parameter as described, for example, in method 100 of FIG. 1 and method 300 of FIG. 3.

The computer system 200 includes a microprocessor 204, an input device 210, a storage device 206, a system memory 208, a display 214, and a communication device 212 all interconnected by one or more buses 202. The storage device 206 may be a floppy drive, hard drive, CD-ROM, optical device or any other storage device. In addition, the storage device 206 may be capable of receiving a floppy disk, CD-ROM, DVD-ROM, or any other form of computer-readable medium that may contain computer-executable instructions. The communications device 212 may be a modem, a network card, or any other device to enable the computer system to communicate with other nodes. It is understood that any computer system 200 could represent a plurality of interconnected computer systems such as, personal computers, mainframes, PDAs, and telephonic devices. The communications device 212 may allow communications between the computer system 200 and one or more tools or computer systems used in the fabrication and/or testing of an IC.

The computer system 200 includes hardware capable of executing machine-readable instructions as well as the software for executing acts (typically machine-readable instructions) that produce a desired result. Software includes any machine code stored in any memory medium, such as RAM or ROM, and machine code stored on other storage devices (such as floppy disks, flash memory, or a CD ROM, for example). Software may include source or object code, for example. In addition, software encompasses any set of instructions capable of being executed in a client machine or server. Any combination of hardware and software may comprise a computer system. The codes, executed by a computer, may include code for extracting a key parameter, including performing a correlation analysis and generating a correlation matrix and/or gene map.

Computer readable mediums include passive data storage, such as RAM as well as semi-permanent data storage such as a compact disk read only memory (CD-ROM). An embodiment of the present disclosure may be embodied in the RAM of a computer to transform a standard computer into a new specific computing machine. Data structures are defined organizations of data that may enable an embodiment of the present disclosure. For example, a data structure may provide an organization of data, or an organization of executable code. Data signals could be carried across transmission mediums and store and transport various data structures, and thus, may be used to transport an embodiment of the present disclosure. The microprocessor 204 may perform the correlation analysis described herein.

Figure 4:
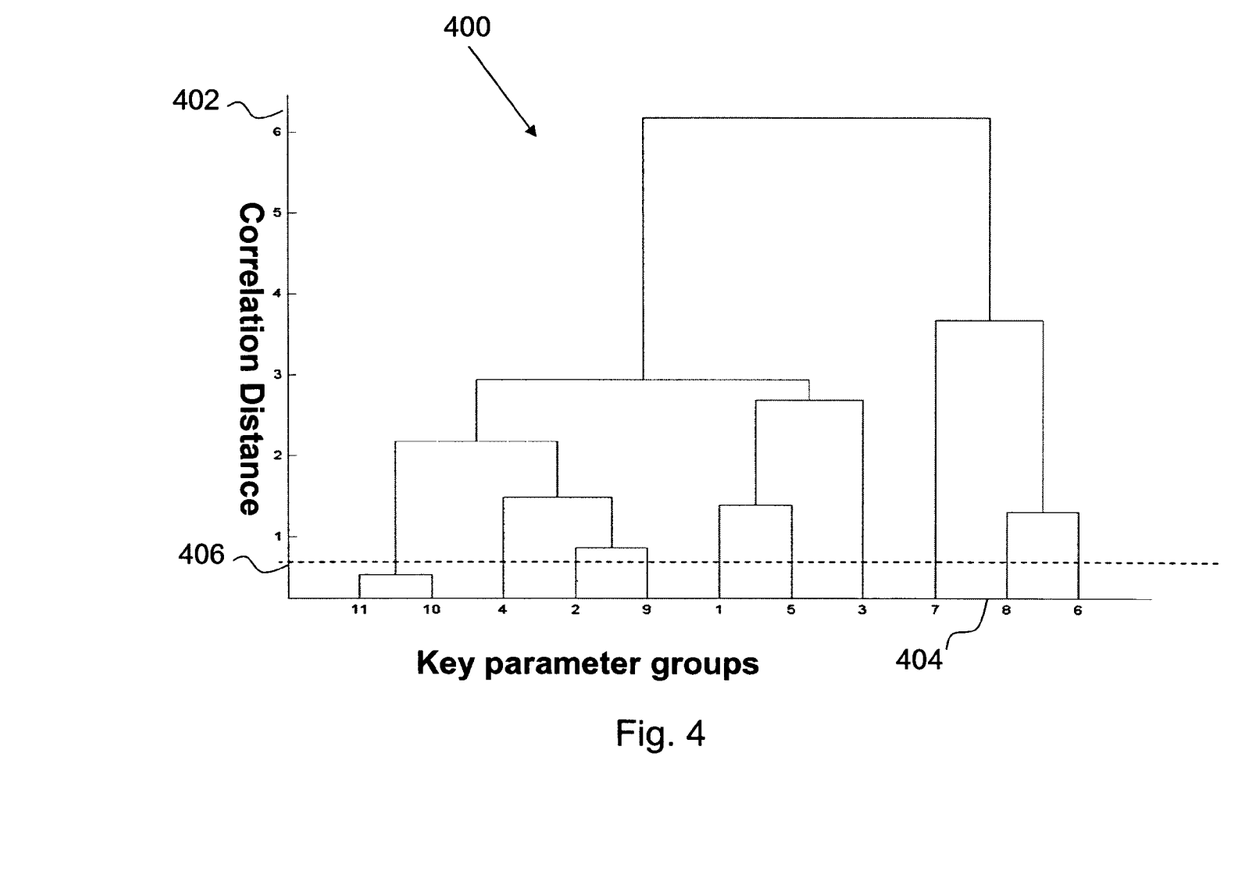
FIG. 4 is a graph illustrating an embodiment of a hierarchical binary tree used in the method of FIG. 3.
Figure 5:
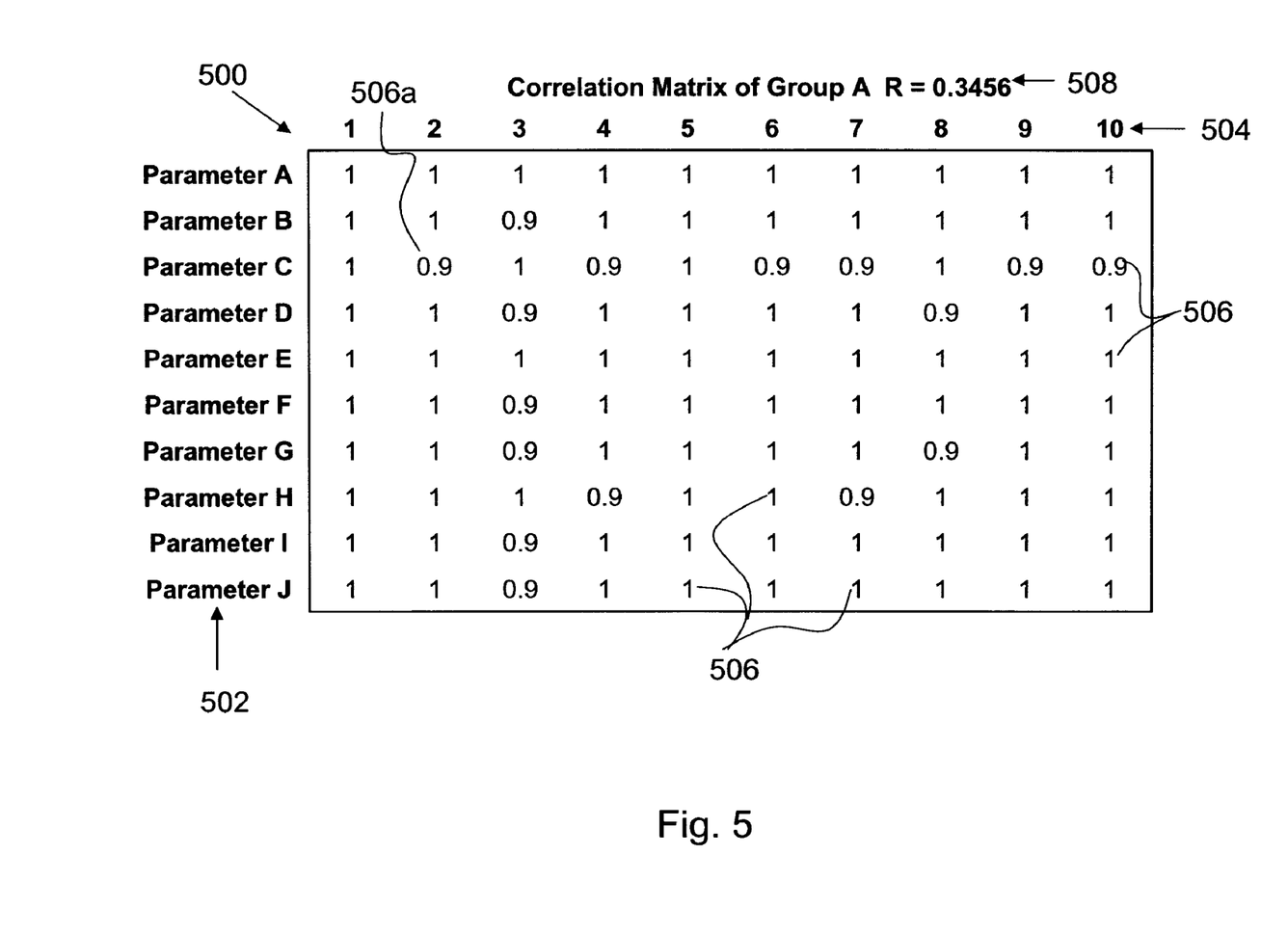
FIG. 5 is a document/screen-shot illustrating an embodiment of a correlation matrix.
Figure 6:
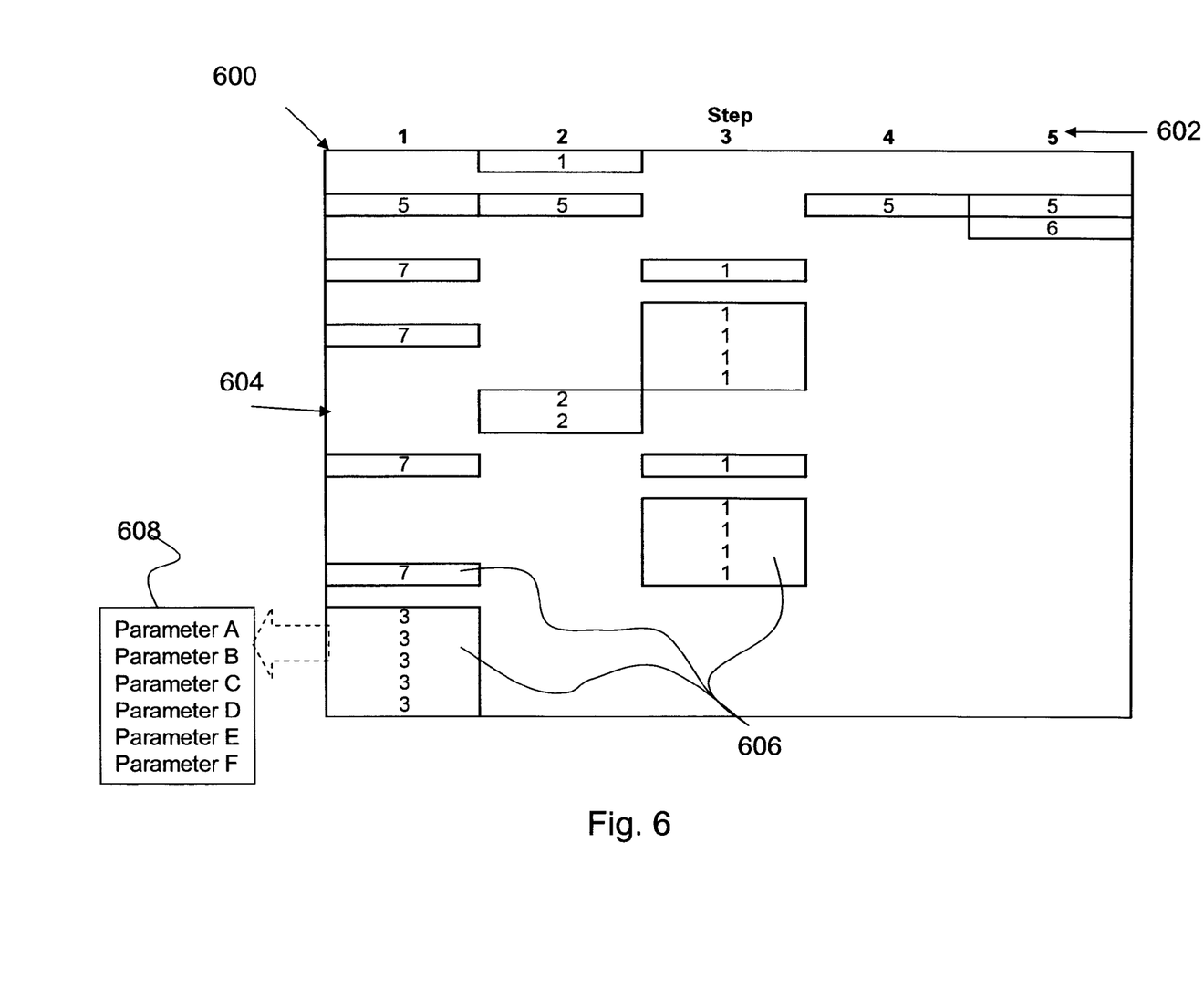
FIG. 6 is a document/screen shot illustrating an embodiment of a gene map.

The display 214 may be operable to display, in human readable form, for example, the hierarchical binary tree, correlation matrix, and/or gene map of FIGS. 4, 5, and 6, respectively. A database 216 may be any standard or proprietary database software known in the art. The physical location of the database 216 is not limiting and may exist remotely from the server, be accessible by internet or intranet. The disclosure of the database 216 includes embodiments that include a plurality of databases. The database 216 may include manufacturing data including, for example, process data such as, equipment data, metrology data; WAT data; and device performance data.

Figure 3:
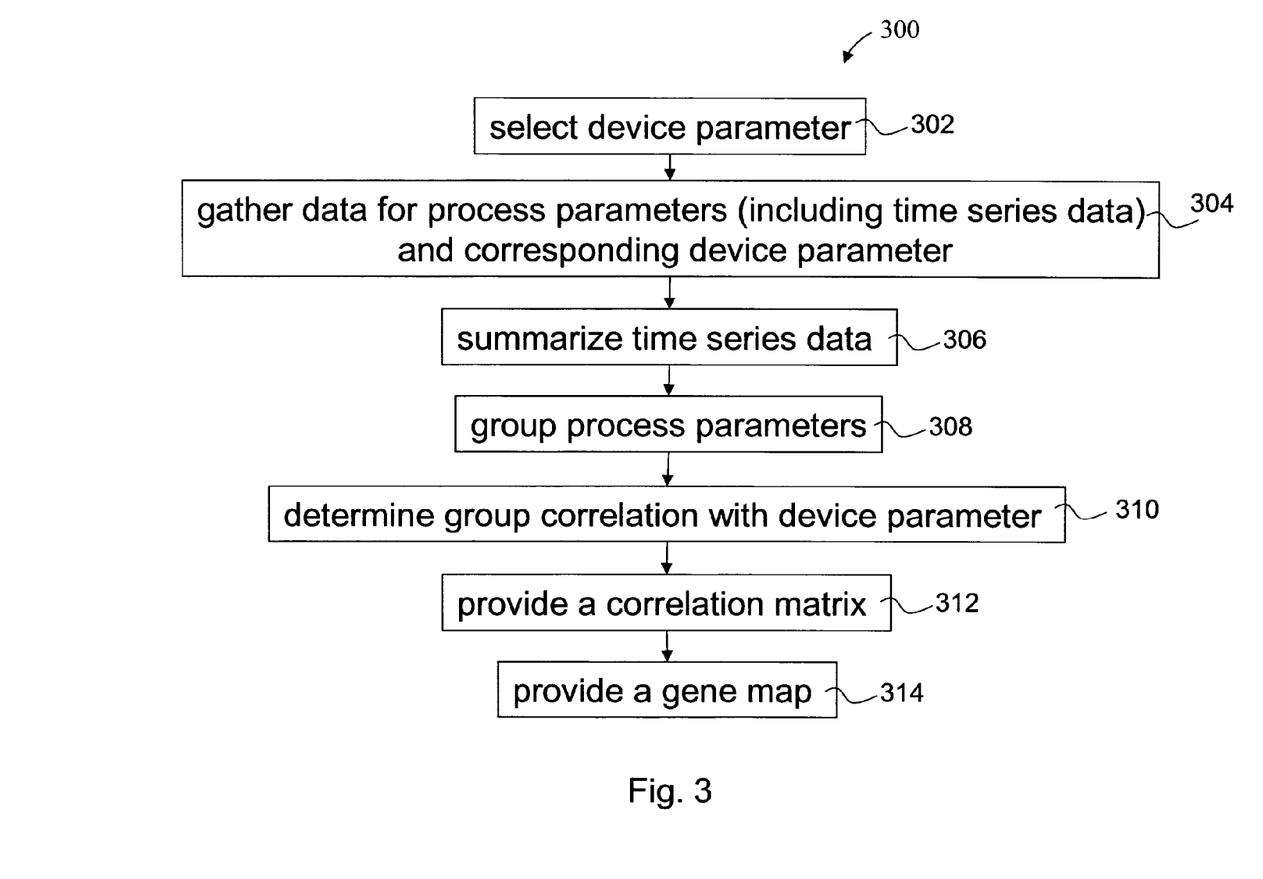
FIG. 3 is a flow chart illustrating an embodiment of a method of correlation analysis.

Referring now to FIG. 3, a method 300 for correlation analysis to extract a key process parameter correlative to a selected device parameter is illustrated. The method of correlation analysis illustrated may be used to extract one or more key manufacturing parameter(s) from a plurality of manufacturing parameters; the key parameter being correlative to a selected parameter. Manufacturing parameters may include, for example, process parameters such as equipment parameters, metrology parameters, wafer test parameters, final test parameters, or any parameter for which data (e.g., value of manufacturing parameter) is gathered during or after the fabrication of an integrated circuit.

The method 300 may be used to perform the correlation analysis of step 104 and/or step 106 of the method 100. The method 300 further illustrates a correlation analysis using a gene map analysis methodology. In the illustrated embodiment, the method 300 extracts a key process parameter that is correlative to a device parameter. This description is provided for illustrative purposes only however and the method 300 may be used to determine the correlation between any parameters, including, for example, in one or more layers of a hierarchical analysis such as described in the method 100 of FIG. 1. For example, in an embodiment, the method 300 is used to extract a WAT parameter that is correlative to a device parameter. In another embodiment, the method 300 is used to extract a process parameter that is correlative to a WAT parameter.

The method 300 begins at step 302 where a device parameter is selected. Step 302 may be substantially similar to step 102 of the method 100 described above. The method 300 then proceeds to step 304 where process data associated with a plurality of process parameters is gathered. In an embodiment, time series process data and a corresponding wafer result (e.g., value of device parameter) is gathered for a plurality of wafers. The process data may include values for one or more equipment parameters and/or metrology parameters determined during the fabrication process of a given wafer; a corresponding wafer result may include a value determined for a device parameter and/or a WAT parameter for the given wafer. In an embodiment, times series process data and a corresponding wafer result is gathered for at least 200 wafers.

The method 300 then proceeds to step 306 where the process data, or portion thereof, is summarized. In an embodiment, the summarizing of the data includes determining one or more statistical values that represent the time series process data (e.g., equipment data). The statistical value may include a maximum value, a minimum value, a standard deviation value, and average value, and/or other possible statistical values. The time series data may be summarized such that one or more of a maximum value, a minimum value, a standard deviation value, and average value are determined for each process step. By way of example, in an embodiment, time series data associated with a process parameter of RF power is gathered. The time series data may be summarized into one or more of a maximum value, a minimum value, a standard deviation value, and average value for each process step experienced by a wafer through the fabrication and with which an RF power is associated.

The method 300 then proceeds to step 308 where process parameters are grouped. The parameters may be grouped using hierarchical clustering. In an embodiment, hierarchical clustering includes determining a first and second parameter that are highly correlated, and grouping the first and second parameter into a single group for further analysis. A group may include any plurality of process parameters that are highly correlated. In an embodiment, parameters that are highly correlated have an $R^2$ value of at least 0.8. Thus, in an embodiment, a group includes parameters that have an $R^2$ value among one another of at least 0.8. In an embodiment, one or more groups of parameters may be accumulated together to form a larger group.

In an embodiment, a hierarchical binary tree is used to group the parameters. The hierarchical binary tree 400 is provided at FIG. 4. The hierarchical binary tree 400 includes a vertical axis 402 including correlation distance and a horizontal axis 404 including parameter group designations. Small correlation distances represent a high $R^2$ value among the parameters of the group. The cut-off point 406 illustrates a selected correlation distance that provides adequate correlation among the parameters. In an embodiment, groups with correlation distances below the cut-off point 406 may be further analyzed as a group, for example, a correlation of the group to the selected device parameter is determined.

The method 300 then proceeds to step 310 where the groups correlation to the selected device parameter determined. A subset of groups, key groups (e.g., those with greater correlation to the selected device parameter) may also be determined. In an embodiment, for one or more groups, the $R^2$ value of the group to the device parameter is calculated by principal component transformation plus stepwise regression. In an embodiment, a group of parameters are related to the device parameter with different mechanisms at different fabrication processing steps. In the embodiment, the regression and $R^2$ calculation are implemented separately for each of the various steps.

As described above, in an embodiment, the correlation (e.g., $R^2$ value) between a group and the selected device parameter is determined by principal component transformation plus stepwise regression. For example, the principal component transformation may transform highly correlated process parameters into a smaller data set (e.g., group). As an example, an $R^2$ value of X1 (a parameter) to the selected device parameter is 0.1, an $R^2$ of X2 (a parameter) to the selected device parameter is 0.1, the $R^2$ of the group of X1 and X2 may be (1)>0.2, (2)=0.2, or (3)<0.2. The result of condition (1), (2) or (3) is dependent upon the data analyzed. Stepwise regression utilizes conditional $R^2$ to select process parameters falling under the designated condition (1). In other words, the methodology described herein is capable of finding parameters that when grouped together find correlation to a device parameter that is greater than the sum of them separately.

Referring to now FIGS. 3 and 5, the method 300 then proceeds to step 312 where a correlation matrix is provided for one or more groups. A correlation matrix 500 is illustrated in FIG. 5. The correlation matrix 500 provides (e.g., displays) the correlation (e.g., $R^2$ value) among parameters of a group. The correlation matrix 500 may be provided by the display 214, described above in reference to FIG. 2. The correlation matrix 500 may be provided for group determined to be a key group (e.g., sufficient correlation to the device parameter). The correlation matrix 500 includes a vertical axis 502 including a plurality of parameters within the group for which the correlation matrix is provided. The horizontal axis 504 includes the same plurality of parameters (denoted by numerals instead for parameter name for ease of use). As such, the diagonal illustrates an identity value, an $R^2$ of 1. The entries in the correlation matrix 500, for example as illustrated by reference number 506, provide the $R^2$ value between the parameters. For example, reference number 506a illustrates an $R^2$ value of 0.9 between parameter B and parameter C. The correlation matrix 500 may be color-coded to easily illustrate the relative correlation values. In an embodiment, R values of are categorized into categories of 1, <0.9, <0.75, <0.5, <0.25, <0.1, <0, <−0.1, <−0.25, <−0.5, <−0.75, <−0.9, and <−1 with one or more of the categories being illustrated in a different color. The correlation matrix 500 includes a title 508 that provides for the group name and a correlation value (e.g., $R^2$ value) to the selected device parameter.

Referring now to FIGS. 3 and 6, the method 300 then proceeds to step 314 where a gene map is generated; a gene map 600 is illustrated in FIG. 6. The gene map 600 displays, for a plurality of process steps, a relative ranking of the correlation between a process parameter, or group of parameters, and the selected device parameter. The gene map 600 may be displayed on a display, such as the display 214, described above with reference to FIG. 2. The gene map 600 may be advantageous in that it can highlight to a user the process parameters most correlative to the selected device parameter in a relative ranking. In an embodiment, one gene map is displayed for each device parameter selected in step 302.

The gene map 600 includes a plurality of fabrication process steps 602 denoted 1, 2, 3, 4, and 5. A vertical axis 604 represents a plurality of process parameters. Having determined the correlation each group of parameters to the selected device parameter, as described above in step 310, each group may be ranked based on the strength of its correlation, and assigned a relative number. For example, the group of parameters with the highest correlation (e.g., highest $R^2$ value) to the device parameter may be assigned a "1," the group of parameters with the next highest correlation (e.g., second highest $R^2$ value) to the device parameter may be assigned a "2," and so forth. The gene map 600 displays each parameter of a group with its assigned ranking, as illustrated by entries 606. The gene map 600 illustrates the ranking the top seven groups, though any number of rankings are possible.

In an embodiment, a user is allowed to select one of the entries 606 and the parameter name will be displayed. In an embodiment, a user is allowed to select one entry 606 and all parameters of the relative group are displayed, as illustrated by box 608. In an embodiment, a user is allowed to select a group in which to review in greater detail. Such further detail may generate a correlation matrix, such as the correlation matrix 500, described above with reference to FIG. 5.

Advantages of the gene map 600 includes an efficient and effective system to provide a user, for example, a process engineer, a manner of systematically reviewing the process parameters that impact a device parameter in the order in which they may effect the selected device parameter. In other embodiments, a gene map may be used to display the relative correlation of any plurality of parameters (e.g., manufacturing parameters) to a selected parameter (e.g., indicative of device performance).

Thus, the method 300 provides for a methodology to perform a correlation analysis including a gene map analysis. The method 300, as illustrated, provides for selection of a device parameter and the extraction of one or more process parameters that are highly correlated to the device parameter. However, other embodiments are possible as the method 300 may be adapted to determine the relative correlation of any plurality of parameters to another parameter, examples of such are provided below.

In an embodiment, a correlation analysis, similar to the method 300, is performed to determine one or more WAT parameters correlative to a selected device parameter. The correlation analysis for extracting a key WAT parameter may be used in conjunction with a correlation analysis for extracting a key process parameter. For example, in an embodiment, a device parameter is selected. A correlation analysis, such as an analysis including one or more steps of the gene map analysis of the method 300, may be used to extract a key WAT parameter that is correlative to the device parameter selected. A correlation analysis, such as an analysis including one or more steps of the gene map analysis of the method 300, may be used to extract a key process parameter that is correlative to the extracted, key WAT parameter.

In an embodiment, a group determined to be correlative to the selected device parameter (e.g., a key group) may be validated by an equipment history log. The equipment history log may provide when preventative maintenance, repair, installation of new equipment or portion thereof, cleaning, and/or other equipment procedures occurred. For example, a graph of device performance data (e.g., device parameter) over time may illustrate a change in the trend of device performance that can be attributed to a procedure included in the equipment history log. For example, a sharp rise in device performance after a preventative maintenance procedure.

Although only a few exemplary embodiments of this invention have been described in detail above, those skilled in the art will readily appreciate that many modifications are possible in the exemplary embodiments without material departing from the novel teachings and advantages of this disclosure.

Thus, provided is method including selecting a device parameter and collecting process data. The process data includes time series process data and values associated with a plurality of process parameters. The time series process data is summarized. A correlation analysis is performed. The correlation analysis identifies a key parameter included in the plurality of process parameters. The key process parameter is correlative to the selected device parameter. A gene map for the selected device parameter is generated.

Also provided is a computer readable medium. The computer readable medium includes instructions to determine a process parameter. The instructions include receiving process data and corresponding device performance data. The process data is associated with a first, second, third, and fourth process parameter. The process data is summarized. The first, second, third, and fourth process parameter are grouped into a first group and a second group. The group's correlation with the first, second, third, and fourth process parameters is determined. A correlation matrix is generated for the first group. A gene map for a device parameter is generated. The gene map includes the relative correlation of the first group to the device parameter and the relative correlation of the second group to the device parameter.

Further provided, is a system. The system is operable to collect manufacturing data. The manufacturing data includes time series data. They system summarizes the time series data. The correlation between a first manufacturing parameter and a second manufacturing parameter is determined. The correlation between a group including the first manufacturing parameter and the second manufacturing parameter and an integrated circuit (IC) performance is also determined. A gene map illustrating a relative correlation of the group and the IC performance is generated.

What is claimed is:

1. An apparatus comprising a non-transitory computer-readable medium encoded with a computer program that, when executed performs the steps of:
selecting a device parameter associated with an integrated circuit, wherein the selected device parameter includes one of a change in saturation current, a leakage parameter, and a speed parameter;
collecting process data, wherein the process data includes time series process data and values associated with a plurality of process parameters;
summarizing the time series process data; and
performing a correlation analysis, wherein the correlation analysis identifies a key parameter included in the plurality of process parameters, wherein the key process parameter is correlative to the selected device parameter, and wherein the correlation analysis includes generating a gene map for the selected device parameter, wherein the gene map includes a first axis showing a plurality of process steps and a second axis illustrating the plurality of process parameters and illustrates the plurality of process parameters relative correlation to the selected device parameter at the plurality of process steps.

2. The apparatus of claim 1, further comprising:
collecting wafer test data, wherein the wafer test data includes values associated with a plurality of wafer test parameters; and
wherein the correlation analysis includes identifying a key wafer test parameter of the plurality of wafer test parameters that is correlative to the selected device parameter.

3. The apparatus of claim 1, wherein the summarizing the time series process data includes determining a statistical value from a group of statistical values consisting of a maximum value, a minimum value, a standard deviation value, an average value, and combinations thereof.

4. The apparatus of claim 1, wherein the correlation analysis includes grouping the plurality of process parameters to provide at least a first group and a second group.

5. The apparatus of claim 4, wherein a coefficient of determination of the first group with respect to the selected device parameter is greater than a coefficient of determination of any one process parameter included in the first group.

6. The apparatus of claim 4, wherein the grouping the plurality of process parameters includes determining a correlation among the plurality of process parameters.

7. The apparatus of claim 6, wherein the grouping the plurality of process parameters includes selecting process parameters such that the first group has a correlation among the plurality of process parameters of coefficient of determination (an $R^2$ value) of at least 0.8.

8. The apparatus of claim 4, further comprising:
determining a correlation of the first group to the selected device parameter using principal component transformation and stepwise regression.

9. The apparatus of claim 4, further comprising:
providing a correlation matrix for the first group.

10. The apparatus of claim 1, wherein the plurality of process parameters are grouped into a third group and a fourth group, and wherein the gene map includes a ranking of the third group and the fourth group, wherein the ranking provides for a relative correlation to the selected device parameter.

11. The apparatus of claim 1, further comprising:
performing a split lot to determine a value for the key process parameter.

12. A non-transitory computer readable medium comprising computer readable instructions to perform a correlation analysis, the computer readable instructions providing instructions to:
receive process data and corresponding device performance data, wherein the process data is associated with a first, second, third, and fourth process parameter, wherein the first, second, third, and fourth process parameter are each associated with an integrated circuit and indicative of performance of the integrated circuit, and wherein the performance of the integrated circuit is determined by at least one device parameter selected from the group consisting of a saturation current, a leakage parameter, and a speed parameter;
summarize the process data;
group the first and second process parameters into a first group and the third and fourth process parameters into a second group, wherein the grouping is determined using the correlation between the first and second parameter and the correlation between the third and fourth process parameter;
generate a correlation matrix for the first group;
generate a gene map for the at least one device parameter having a first axis showing a plurality of process steps and a second axis illustrating a plurality of process parameters including the first, second, third, and fourth process parameters, wherein the gene map includes the relative correlation of the first group to the at least one device parameter and the relative correlation of the second group to the at least one device parameter at the plurality of process steps.

13. The computer readable medium of claim 12, further comprising instructions to:
generate a hierarchical binary tree including the first, second, third, and fourth process parameters.

14. The computer readable medium of claim 12, wherein the summarizing the data includes summarizing time series equipment data.

* * * * *